US010962964B2

(12) United States Patent
Farren et al.

(10) Patent No.: US 10,962,964 B2
(45) Date of Patent: Mar. 30, 2021

(54) ASSEMBLY LINE ARTICLE TRACKING SYSTEM

(71) Applicant: NIKE, Inc., Beaverton, OR (US)

(72) Inventors: John Matthew Farren, Taichung (TW); Todd R. Farr, Taichung (TW); Howard Fu, Taichung (TW); Dragan Jurkovic, Taichung (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/793,980

(22) Filed: Feb. 18, 2020

(65) Prior Publication Data

US 2020/0183366 A1 Jun. 11, 2020

Related U.S. Application Data

(63) Continuation of application No. 15/509,093, filed as application No. PCT/US2016/034159 on May 25, 2016, now abandoned.
(Continued)

(51) Int. Cl.
| | | |
|---|---|---|
| *G05B 19/418* | (2006.01) | |
| *A43D 3/02* | (2006.01) | |
| *A43D 1/04* | (2006.01) | |
| *A43D 119/00* | (2006.01) | |
| *G06Q 50/04* | (2012.01) | |
| *G06Q 10/06* | (2012.01) | |

(Continued)

(52) U.S. Cl.
CPC ........ *G05B 19/4187* (2013.01); *A43B 3/0005* (2013.01); *A43D 1/04* (2013.01); *A43D 3/02* (2013.01); *A43D 111/00* (2013.01); *A43D 119/00* (2013.01); *G05B 19/4189* (2013.01); *G05B 19/41805* (2013.01); *G06Q 10/06316* (2013.01); *G06Q 50/04* (2013.01); *G05B 2219/42337* (2013.01); *Y02P 90/30* (2015.11)

(58) Field of Classification Search
CPC ............ G05B 19/4187; G05B 19/4189; G05B 19/41805; G05B 2219/42337; A43D 1/04; A43D 119/00; A43D 111/00; A43D 3/02; A43B 3/0005; G06Q 10/06316; G06Q 50/04; Y02P 90/30
See application file for complete search history.

(56) References Cited

U.S. PATENT DOCUMENTS 4,377,890 A 3/1983 Miller
4,741,062 A 5/1988 Blanc et al.
(Continued)

FOREIGN PATENT DOCUMENTS

CN 101983117 A 3/2011
CN 103124976 A 5/2013
(Continued)

*Primary Examiner* — James J Lee
*Assistant Examiner* — Shon G Foley
(74) *Attorney, Agent, or Firm* — Shook, Hardy & Bacon LLP

(57) ABSTRACT

Manufacturing of article of footwear include temporarily mating a sole and an upper to determine processes to be performed to the sole and/or the upper before permanently mating. As specific operations are determined based on the particular combination of a sole and an upper, the sole and upper are individually tracked through the subsequent processes to ensure the correct pairing is achieved at the time of permanent mating. The tracking may leverage identifiers in the tooling supporting the upper and in the sole.

17 Claims, 6 Drawing Sheets

Related U.S. Application Data

(60) Provisional application No. 62/167,732, filed on May 28, 2015.

(51) Int. Cl.
*A43B 3/00* (2006.01)
*A43D 111/00* (2006.01)

(56) References Cited

U.S. PATENT DOCUMENTS

| | | |
|---|---|---|
| 9,036,337 B2 | 5/2015 | Smyth et al. |
| 2004/0074966 A1 | 4/2004 | Holzer |
| 2005/0071032 A1 | 3/2005 | Urabe |
| 2006/0143839 A1 | 7/2006 | Fromme |
| 2006/0200261 A1 | 9/2006 | Monette et al. |
| 2010/0101117 A1 | 4/2010 | Koo |
| 2011/0011224 A1 | 1/2011 | Levene |
| 2011/0303746 A1 | 12/2011 | Learmonth et al. |
| 2013/0087620 A1 | 4/2013 | Sharma et al. |
| 2013/0131853 A1 | 5/2013 | Regan et al. |
| 2014/0180866 A1 | 6/2014 | Gonzales |
| 2014/0237737 A1 | 8/2014 | Regan et al. |
| 2015/0101134 A1 | 4/2015 | Manz et al. |
| 2017/0308066 A1 | 10/2017 | Farren et al. |

FOREIGN PATENT DOCUMENTS

| | | |
|---|---|---|
| CN | 103218632 A | 7/2013 |
| CN | 103732004 A | 4/2014 |
| CN | 104054082 A | 9/2014 |
| EP | 0313312 A2 | 4/1989 |
| KR | 10-2008-0040360 A | 5/2008 |
| KR | 10-2008-0043346 A | 5/2008 |
| TW | M535485 U | 1/2017 |
| WO | 2003/079158 A2 | 9/2003 |
| WO | 2007/033294 A2 | 3/2007 |
| WO | 2009/105893 A1 | 9/2009 |

ASSEMBLY LINE ARTICLE TRACKING SYSTEM

CROSS-REFERENCE INFORMATION

This application is a Continuation Application of U.S. application Ser. No. 15/509,093, filed Mar. 6, 2017, entitled "Assembly Line Article Tracking System," which is a 35 U.S.C. § 371 Application claiming priority to PCT/US2016/034159, filed on May 25, 2016, entitled "Assembly Line Article Tracking System," which claims priority to U.S. Patent Application No. 62/167,732, filed May 28, 2015, entitled "Assembly Line Article Tracking System." The entirety of the aforementioned applications are incorporated by reference herein.

FIELD

Identifying and associating components within a manufacturing system.

BACKGROUND

Manufacturing of articles of footwear includes identifying how two or more components will physically interact to determine and refine subsequent operations to be performed on those articles. However, if the same articles are not reunited after the operations are performed based on the determined interaction; the resulting article of footwear may be aesthetically unappealing and/or functionally improper.

SUMMARY

Aspects hereof relate to systems and methods of identifying a first article and a second article during manufacturing so that prior to mating the particular first and second articles, the combination of the articles may be verified. It is contemplated that a manufacturing tracking system comprises a first tool having a first identifier. The first tool is configured to receive a first article. The system is comprised of a first sensor of a first sensor type that is configured to read the first identifier. The system also includes a second identifier that is coupled with a second article. Further, the system includes a first sensor of a second sensor type that is configured to read the second identifier. The system may include a computing system having a processor and memory that are configured to associate the first identifier and the second identifier together. The system also includes a first processing station for the first article, a second processing station for the second article, a second sensor of the first sensor type that is configured to read the first sensor following the first processing station, and a second sensor of the second sensor type that is configured to read the second sensor following the second processing station.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
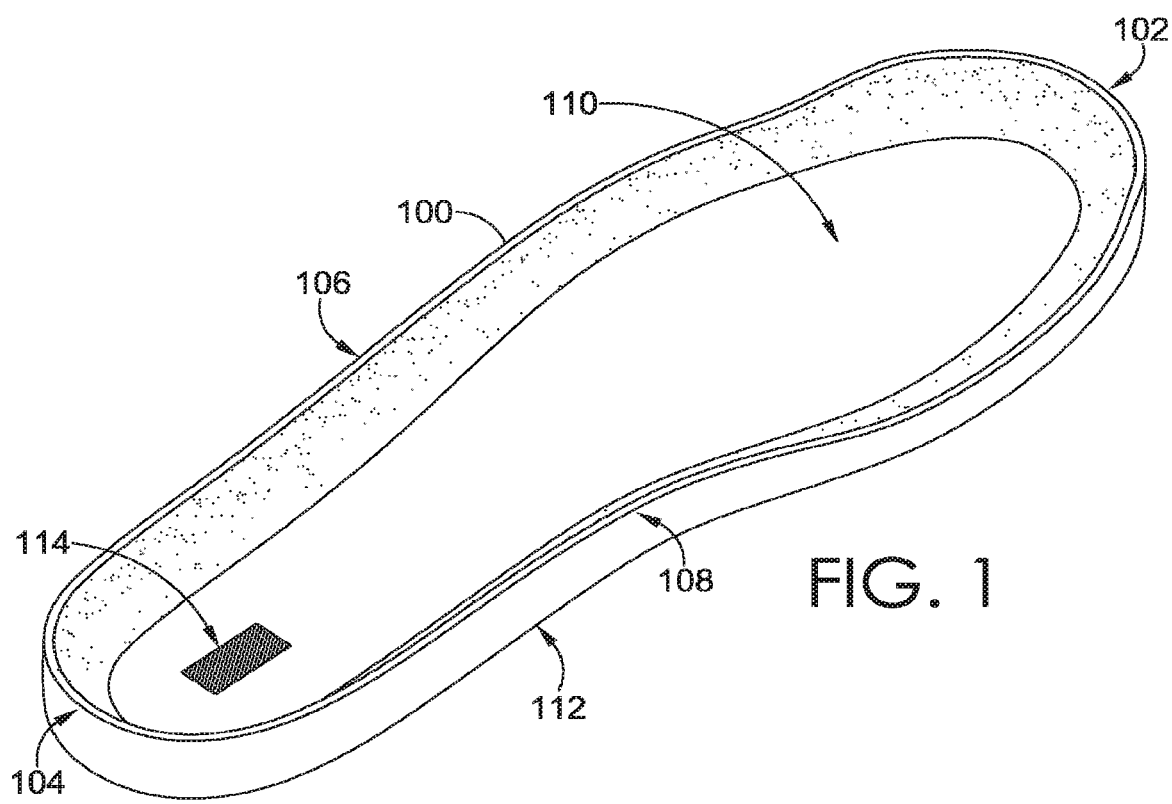
FIG. 1 depicts an exemplary sole having an identifier, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects hereof relate to systems of identifying a first article and a second article during manufacturing so that prior to mating the particular first and second articles, the combination of the articles may be verified. It is contemplated that a manufacturing tracking system comprises a first tool having a first identifier. The first tool is configured to receive a first article. The system is comprised of a first sensor of a first sensor type that is configured to read the first identifier. The system also includes a second identifier that is coupled with a second article. Further, the system includes a first sensor of a second sensor type that is configured to read the second identifier. The system may include a computing system having a processor and memory that are configured to associate the first identifier and the second identifier together. The system also includes a first processing station for the first article, a second processing station for the second article, a second sensor of the first sensor type that is configured to read the first sensor following the first processing station, and a second sensor of the second sensor type that is configured to read the second sensor following the second processing station.

In another aspect, a method is provided for tracking a first article and a second article in a manufacturing system. The method includes applying a first article to a first tool, scanning the first tool to read a first identifier of the first tool, applying a second identifier to a second article, scanning the second article to read the second identifier, and associating the first identifier and the second identifier such that the first article applied to the first tool can be associated with the second article. The method further includes performing a first operation to either the first article on the first tool or the second article. Such that subsequent to performing the first operation, scanning the first tool to read the first identifier and scanning the second article to read the second identifier. The method also includes mating the first article with the second article subsequent to confirming the first tool and the second article are associated based on the scan of the first tool and the second article after the first operation.

Having briefly described an overview of embodiments of the present invention, an exemplary operating environment suitable for implementing embodiments hereof is described below.

Articles of footwear may include shoes, boots, sandals, and the like. The term "shoe" will be used herein to generically reference an article of footwear. It is understood that the term "shoe" is not limited to a traditional style of a shoe, but instead may include a boot, sandal, running shoe, cleat, and other article of footwear. Generally, a shoe is comprised of a ground-contacting portion, which may be referred to as a sole. The sole may be formed from a variety of materials and/or a variety of individual components. For example, a sole may comprise an outsole, a midsole, and/or and insole, as is known in the art. The shoe may also be comprised of a foot-securing portion that is effective to secure a user's foot to the sole. The foot-securing portion may be referred to as a shoe upper, or "upper" for short herein. An upper may be formed from one or more materials and/or one or more individual components. For example, an upper may be formed from a plurality of individual portions that are coupled together through adhesive, stitching, fusing, welding, and the like. Alternatively, the upper may be formed as a unitary member from a common manufacturing process, such as knitting and/or weaving. Other techniques are contemplated for forming an upper and are applicable to the concepts provided herein.

Regardless of the materials or techniques for forming the upper and/or sole, additional shaping and forming may be used to obtain a desired three-dimensional shape. Traditionally, a tooling known as a cobbler's last serves as a shape about which a shoe may be formed to a desired size, shape, and construction. As used herein, the term "last" will reference a tool form about which an upper may be formed. In some aspects, a sole may be coupled (e.g., adhered, stitched) to the upper as the upper is lasted (i.e., having the last positioned in an interior volume of the upper). The last may define the contours, shape, style, and other characteristics of a resulting shoe.

In the manufacture of a shoe, each of the upper and the sole may have a variety of operations done independently before being brought together in a mated relationship. For example, one or more manufacturing processes may be performed on the upper that are done without the sole being attached to the upper. Similarly, one or more processes may be performed on the sole without the upper being attached thereto. Therefore, it is contemplated that a portion of the upper is processed and formed independent of the sole by the upper traveling on a separate assembly or production line from the sole during a portion of the shoe manufacturing and assembly process. The same is contemplated for the sole.

Material from which the upper and the sole are formed may be malleable or otherwise deformable. Therefore, manufacturing tolerances for a shoe allow for a variation in dimensions and shape of one or more portions. However, a formed shoe with an upper and sole mated may not function properly or feel comfortable to a wearer if the upper and the sole are not properly mated and aligned. Further compounding a difficulty in achieving a desired fit of a shoe, the shape of a first upper may deviate from the shape of what is intended to be a similar second upper. Similarly, a first sole will likely deviate from the shape of what is intended to be a similar second sole. This deviation in comparable components may be a result of the material forming the components, the processes being used to form the components, and/or a difference in techniques or parameters when manipulating the components.

Because of a unique size and shape for each component, such as an upper and a sole, aspects hereof associate a first component with a second component prior to an operation being performed separately on each of the components such that following the operation(s), the first component and the second component can be mated. For example, a process that may be applied is the application of an adhesive to an upper and/or a sole, where the adhesive is used to bond the upper with the sole as part of a mating operation. In some forms of a shoe, the adhesive is desired to be applied up to an intersection of the upper and the sole without extending beyond that intersection. Adhesive that extends beyond the intersection may be visible on the completed shoe and provide an unfinished appearance. Similarly, if the adhesive fails to extend to the intersection of the sole and the upper, the sole may be prone to separating from the upper at the location of the incomplete application of adhesive. Therefore, in aspects, an intended manufacturing operation applies adhesive up to the intersection of the sole and the upper without extending beyond or failing to reach the intersection. Because a first sole and a second sole that are intended to have a similar size may actually have different size/shape characteristics, the application of adhesive may not extend to the intersection of the upper and the mated sole if the intersection was first identified with a different sole and/or upper combination.

Figure 5:
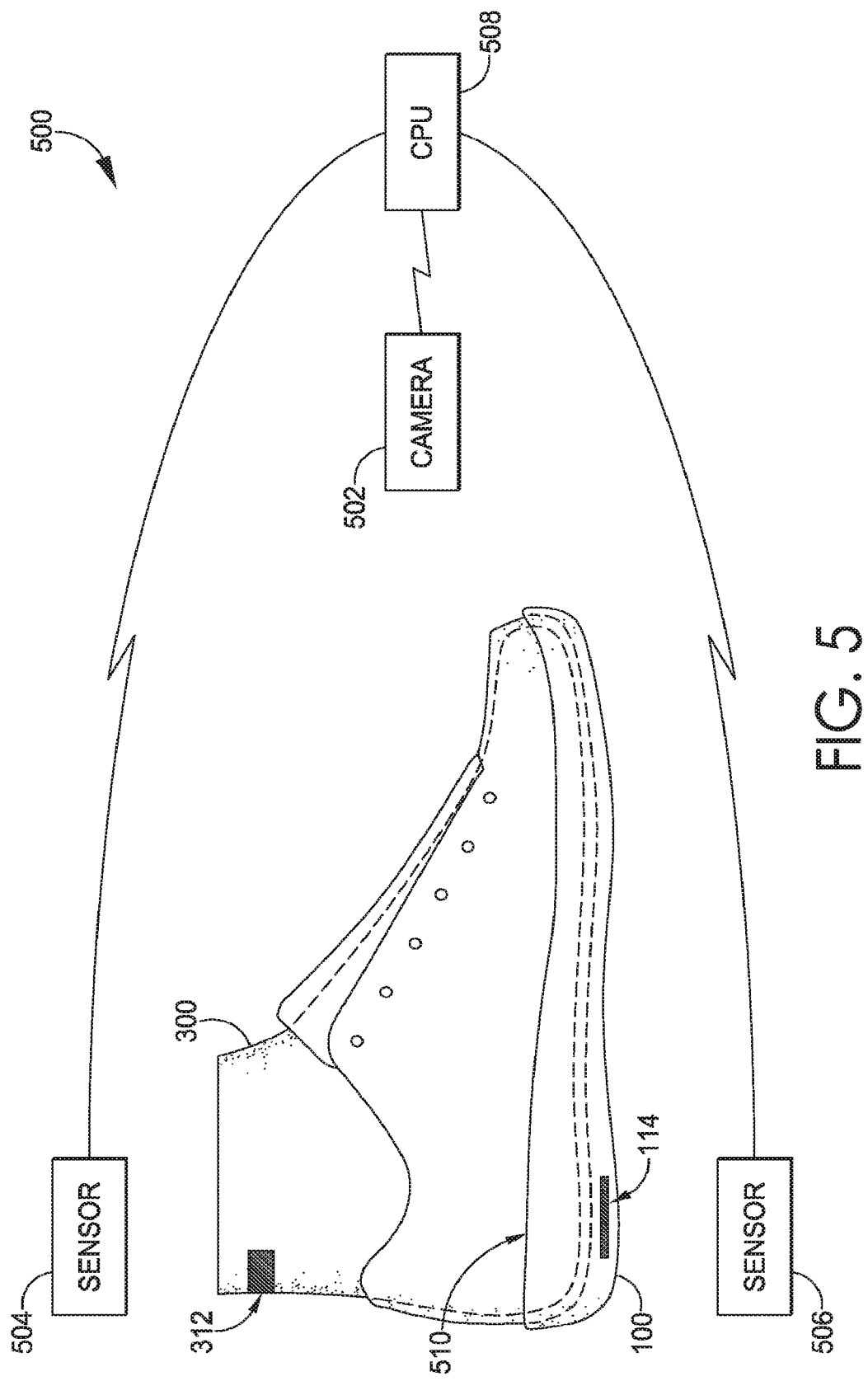
FIG. 5 depicts an exemplary system for detecting identifiers of a sole and a last during an operation, in accordance with aspects hereof.

Providing a specific example of the above scenario, a first upper and a first sole may be temporarily joined/mated to identify an intersection between the first upper and the first sole. This intersection is known as the biteline. The biteline represents a transition line of where the sole begins overlapping the upper when viewing from a superior (e.g., top) to an inferior (e.g., bottom) direction. The biteline is illustrated in FIG. 5 hereinafter. Following the biteline being identified on the first upper when temporarily mated with the first sole, the first upper and the first sole may be separated to perform a series of processes on each and independent of each. For example, printing, cleaning, priming, trimming, finishing, applying adhesive, and other processes may be performed. A first specific operation for this example includes the application of adhesive on a foot-facing surface of the sole and second specific operation for this example includes application of adhesive to a sole-facing surface of the upper. The application of adhesive may be done by an automated mechanism like an adhesive applicator controlled by a robotic mechanism. The path followed by the robotic mechanism may be determined from a three dimensional mapping of the upper and the sole to determine a biteline up to which adhesive is to be applied. The tool path is based, in this example, on applying adhesive to locations of the upper that will be covered by the first sole up to the biteline without extending beyond. Unfortunately, the biteline on the first upper is identified based on the specific first sole. If a second sole is instead attempted to be mated with the upper based on the first sole-generated biteline, the adhesive may extend beyond or not to the transition between the first upper and the incorrect second sole. Therefore, it is desired, in an exemplary aspect, for the first sole and the first upper to be reunited following the one or more unique processes.

Maintaining an identification of a given component, such as a sole or an upper can be difficult in the manufacturing environment. Further, in an automated manufacturing environment, the identification of unique components may be difficult. Further yet, an identification system for a component may be desired that does not affect the aesthetics and/or function of the component. Therefore, in an exemplary aspect, an identification technology that allows automated detection without detracting from the aesthetics or function of the component may be selected.

Turning to FIG. 1 that depicts an exemplary sole 100 having a toe end 102, a heel end 104, a medial side 108, and a lateral side 106, in accordance with aspects hereof. The sole 100 also has a foot-facing surface 110 and a ground-facing surface. The sole 100 is comprised of a lip or side wall extending around one or more portions. At the superior edge of the sidewall, as will be discussed in FIG. 5 hereinafter, a biteline may be identified on a mated upper.

Also depicted in FIG. 1 on the sole 100 is an identifier 114. The identifier 114 is a structure that is identifiable for the identification of the sole 100. A variety of technologies may be implemented as the identifier 114, which is generically depicted for illustration purposes herein. For example, the identifier 114 may be a radio frequency identification (RFID) technology. The RFID technology may be either passive or active. For example, an RFID tag may respond to the application of electromagnetic energy, such as a radio signal, that causes the RFID tag to transmit a signal. The signal may be a unique identifier that is received by a receiver tuned to a frequency at which the RFID tag transmits. An active RFID tag may periodically provide a signal in an unsolicited manner in the event a receiver is within range to detect the signal. An RFID may be read only or it may be rewritable such that a unique signature may be programmed to the RFID, in an aspect hereof.

Additional technologies are contemplated for the identifier 114, such as alternative responsive technologies. For example, it is contemplated that a randomly (or purposely) oriented grouping of elements, such as metallic fibers, may be deposited as the identifier 114. The oriented grouping of element, when exposed to electromagnetic energy (e.g., radio waves) provide a reply (e.g., reflection) signal that is dictated by the orientation, position, and/or clustering of the grouping of elements. The reply may be unique to the configuration of the grouping of elements and therefore provide a means for detecting a specific grouping of elements from another grouping of elements. Other technologies are contemplated, such as bar codes, images, printed identifiers, and the like. Therefore, the identifier 114 may be based on any or a number of technologies that allow for the identification of the identifier 114 relative to one or more other identifiers.

While the identifier 114 is depicted in a heel region of the sole 100 on the foot-facing surface 110, it is contemplated that the identifier 114 may be positioned or placed at any location. In an exemplary aspect, the identifier 114 is embedded within the sole 100, positioned at a toe region, positioned at a ground-facing surface, at an arch region between the toe and heel end, or elsewhere on the sole. In an exemplary aspect, the identifier 114 is positioned on or near the foot-facing surface 110 such that the identifier 114 is obscured by an upper following a mating operation. This obscuring of the identifier 114 prevents the identifier 114 from being visible on a finished shoe. The location of the identifier 114, which may be permanent to the article resulting in a sacrificial identifier, may be selected based on the technology on which the identifier is based, on the location that limits adverse effects to the finished shoe, or on other factors.

Figure 2:
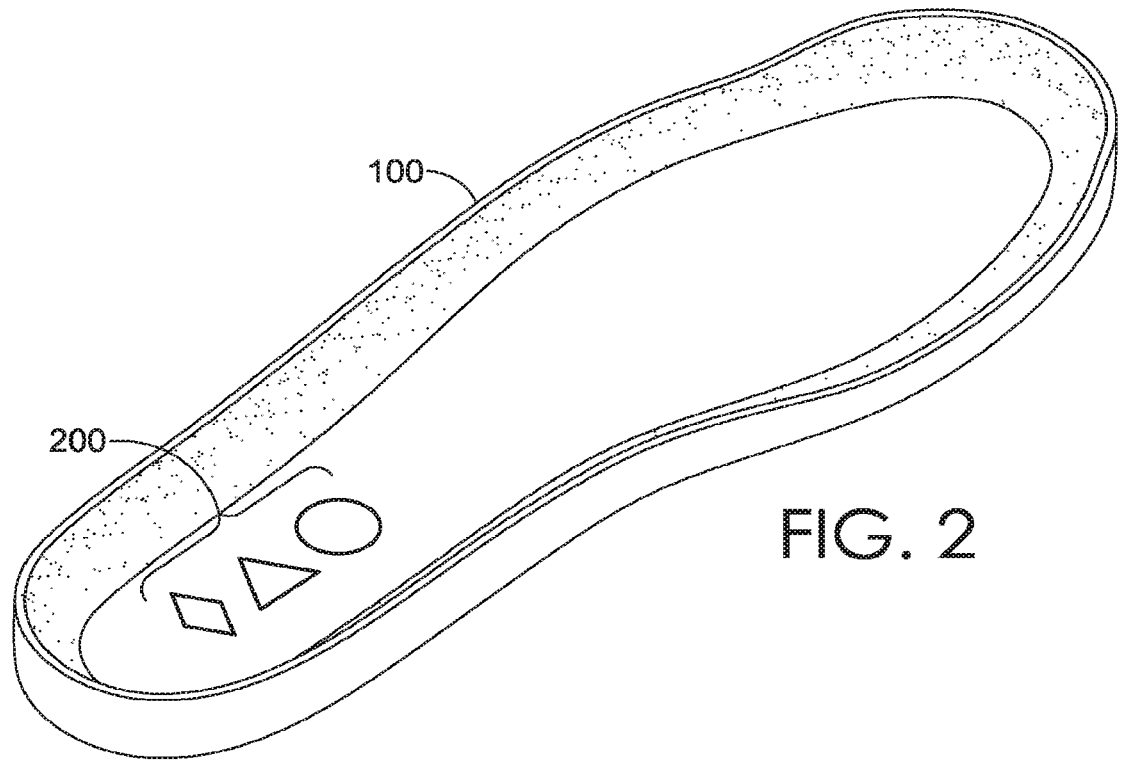
FIG. 2 depicts the sole having an alternative identifier, in accordance with aspects hereof.

FIG. 2 depicts the sole 100 having an alternative identifier 200, in accordance with aspects hereof. The identifier 200 may be based on a technology in which a detectable material is deposited on the sole 100. For example, it is contemplated that an ink-like material that is detectible as a result of one or more electromagnetic energy sources applying energy thereto are printed on the sole 100 in a particular manner. For example, the ink may be a polyurethane-based material having one or more electrically responsive materials (e.g., metallic, carbon, etc.) contained therein is printed in a pattern on the article. The pattern may be optically detected (e.g., by way of a camera, or electrically detected based on a signal output as a result of exposure to electromagnetic radiation. In this example, the identifier 200 is formed as a series of shapes, such as a diamond, triangle, and circle. This pattern provides a unique signature when optically or electrically detected. The unique signature may be used to assign a unique identity to the sole 100. It is contemplated that any pattern, lettering, shapes, lines, and the like may be implemented in any combination or any order to achieve a unique signature, in exemplary aspects.

Figure 3:
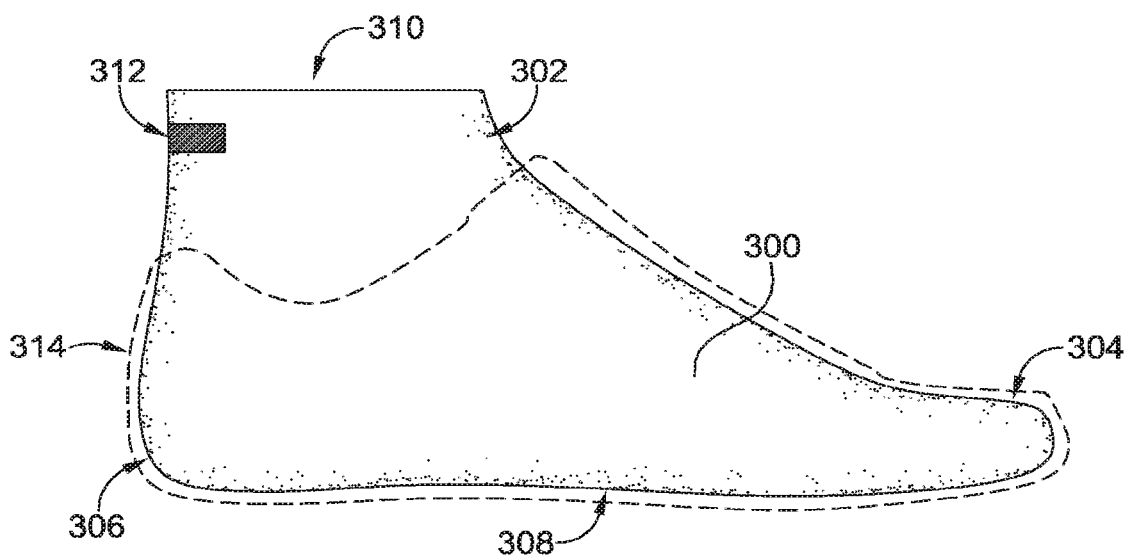
FIG. 3 depicts a last having an identifier associated therewith, in accordance with aspects hereof.

FIG. 3 depicts a last 300, in accordance with aspects hereof. As previously discussed, a last is a tool about which an upper is formed. The last may also serve as a tool for mating the upper with a sole as it provides resistance to pressure applied when mating the sole to the upper. The last 300 has a toe end 304, a heel end 306, a sole-facing surface 308, a superior surface 310, and an exposed portion 302. The exposed portion 302 is a portion of the last 300 that is not obscured by an upper, such as the contextually provided upper 314, when the upper is lasted about the last 300. Further, the last comprises an identifier 312. As depicted in FIG. 3, the identifier 312 is provided in the exposed portion 302, which will be discussed hereinafter.

The identifier 312 may be any type of identifier, such as those discussed in connection with the identifier 114 of FIG. 1. In an exemplary aspect, the identifier 312 is an RFID-based identifier. However, other technologies may be used as an identifier of the last 300. It is contemplated that the last 300 uses a first identifier technology and a sole uses a different identifier technology, in an exemplary aspect. In alternative aspects, the last 300 and a sole use a similar identifier technology. The last 300 may be used in connection with a number of different uppers 314. Therefore, the identifier 312 may be reused in the manufacturing processes as the last 300 is reused following the completion of a shoe. Consequently, it is contemplated that the identifier 312 may be based on a technology that is more costly than the identifier used in connection with a sole, as the identifier used with a sole may stay with the sole following production and be sacrificed. Stated differently, a first identifier type may be used with the tooling that remains in the manufacturing system while a second, different, identifier type may be used with the components being manufactured that will leave the manufacturing system upon completion of the manufacturing with that component.

The location of the identifier 312 relative to the last 300 may be selected based on the technology of the identifier, the manufacturing processes being performed, or other factors. For example, it is contemplated that holding element, such as a robotic arm, may grasp the last 300 (or a portion affixed thereto as will be illustrated in FIG. 4 hereinafter) during a manufacturing process. Therefore, the identifier 312 may be positioned on the last 300 in a location that does not interfere with or is obscured by the material movement mechanisms manipulating the last 300. The avoidance of interference or obscuring may allow for easier or more accurate identification of the identifier 312, in an exemplary aspect. Further, it is contemplated that the identifier 312 may be on a surface, embedded therein, or a combination relative to the last 300 (or structures affixed thereto), in an exemplary aspect.

Figure 4:
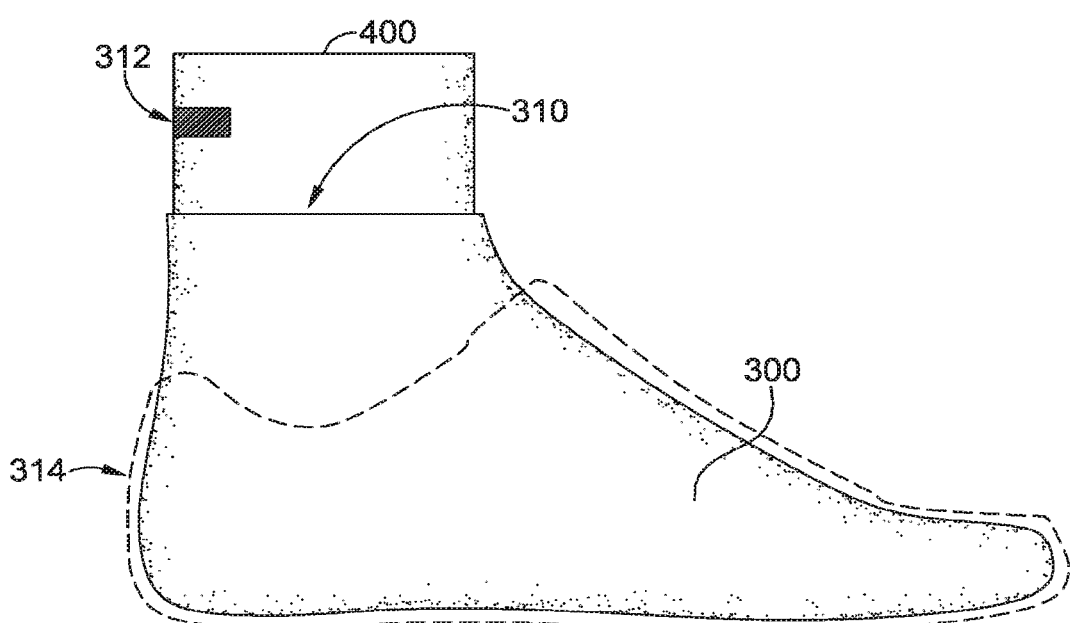
FIG. 4 depicts a last having a supplemental extension with an identifier associated therewith, in accordance with aspects hereof.

FIG. 4 depicts the last 300 having an extension 400 affixed thereto, in accordance with aspects hereof. In this depicted example, the last extension 400 is affixed to the superior surface 310. The last extension 400 has the identifier 312 associated therewith. A last extension 400 may be affixed to the last 300 to allow for the integration of the identifier 312 with an existing inventory of lasts. Additionally, the last extension 400 may provide a greater clearance from the upper and other tooling to provide for easier identification, in an exemplary aspect. Further yet, the last extension 400 may be affixed, temporarily or permanently, with the last 300 to facilitate automated manufacturing processes while still utilizing an existing inventory of lasts, in an exemplary aspect. The location of the identifier on the last extension 400 may be selected for the reasons provided above with connection the FIG. 3, in exemplary aspects. It is contemplated that an identifier associated with a last extension is therefore associated with the last to which the last extension is affixed, in an exemplary aspect.

FIG. 5 depicts an exemplary system 500 for associating the last 300 with the sole 100 based on unique identifiers associated with each, in accordance with aspects hereof. Further, in an exemplary aspect, an image or surface mapping is further associated with the sole 100, the last 300, and/or a combination thereof. The image or surface mapping may be captured, in part with a camera 502, as will be discussed hereinafter. A computing device 508 having a central processing unit and memory is depicted being coupled with a first sensor 504, a second sensor 506, and the camera 502. However, it is contemplated that one or more of the sensors and/or camera are optional and merely provided for illustrative purposes.

The first sensor 504 is a sensor for detecting and identifying the identifier 312 of the last 300. The sensor 506 is a sensor for detecting and identifying an identifier 114 of the sole 100. It is contemplated that a single sensor may detect both the identifier 312 and 114, in an exemplary aspect. Further, it is contemplated that the first sensor 504 relies on a different technology than the second sensor 506, in an exemplary aspect. A sensor may leverage a variety of technology. For example, in connection with an RFID identifier, the sensor may include both am electromagnetic energy (e.g., radio waves) transmitter and a receiver. For example, the sensor may output radio waves that are then converted into energy by an identifier to transmit a signature back to the sensor, which is received by a receiving device in the sensor. Alternatively, the identifier may broadcast a signal having a signature that is then received by a sensor.

In alternative aspects, a sensor may be an energy transmitter that broadcasts energy that is then refracted and/or reflected by one or more elements of the identifier. The sensor may have a receiving device capable of detecting and interpreting the reflected and/or refracted energy to determine a signature for the identifier, in an exemplary aspect. Further, it is contemplated that a sensor is an imaging device that operates in one or more wavelengths, such as visible light spectrum, infrared light spectrum, ultraviolet light spectrum, and/or x-ray spectrum. In the example, it is contemplated that the sensor is comprised of a detection mechanism for detecting energy in the selected wave lengths. It is further contemplated that the imaging device may be comprised of an energy emitter, such as a light source in one or more spectrums. Therefore, it is contemplated that a sensor may implement a variety of technologies compatible with a provided identifier to detect and identify a unique identifier/signature of an identifier, such as the identifier 312 and/or 114.

The camera 502, which is optional in exemplary aspects, may be utilized to detect a biteline 510 that is formed at the intersection of the sole 100 and the upper. As previously provided, a biteline may represent a location up to which adhesive or other bonding agents may be applied between the upper and the sole. If the adhesive extends above the biteline, the adhesive will be exposed on a surface of the upper and not obscured by the sole. Further, if the adhesive fails to be applied up to the biteline, the sole may be prone to separation from the upper at that location.

It is contemplated that the lasted upper on the last 300 may be temporarily mated with the sole 100 to allow a detection of the biteline 510. The biteline 510 may be determined by analyzing one or more images captured by the camera 502. The computing device 508 may generate a multi-dimensional mapping based on the images captured by one or more cameras 502. This mapping may be associated, within a computing environment, with the identifier 312 and/or 114 for future use, such as determining a tool path for application of adhesive on the upper lasted to the last 300, in an exemplary aspect.

An association between the identifier 312 and the identifier 114 may be maintained at the computing device 508, in an exemplary aspect. For example, the sensor 504 may identify the identifier 312 and the sensor 506 may identify the identifier 114 during biteline detection. As a result of these identification, the upper lasted on the last 300 having the identifier 312 is associated with the sole 100 having the identifier 114. Therefore, following one or more processes performed to each of the individual components (e.g., the upper lasted on the last 300 and the sole 100), a verification can be performed that the upper lasted on the last 300 is remated with the sole 100 such that the previously detected and mapped biteline 510 is maintained.

Figure 6:
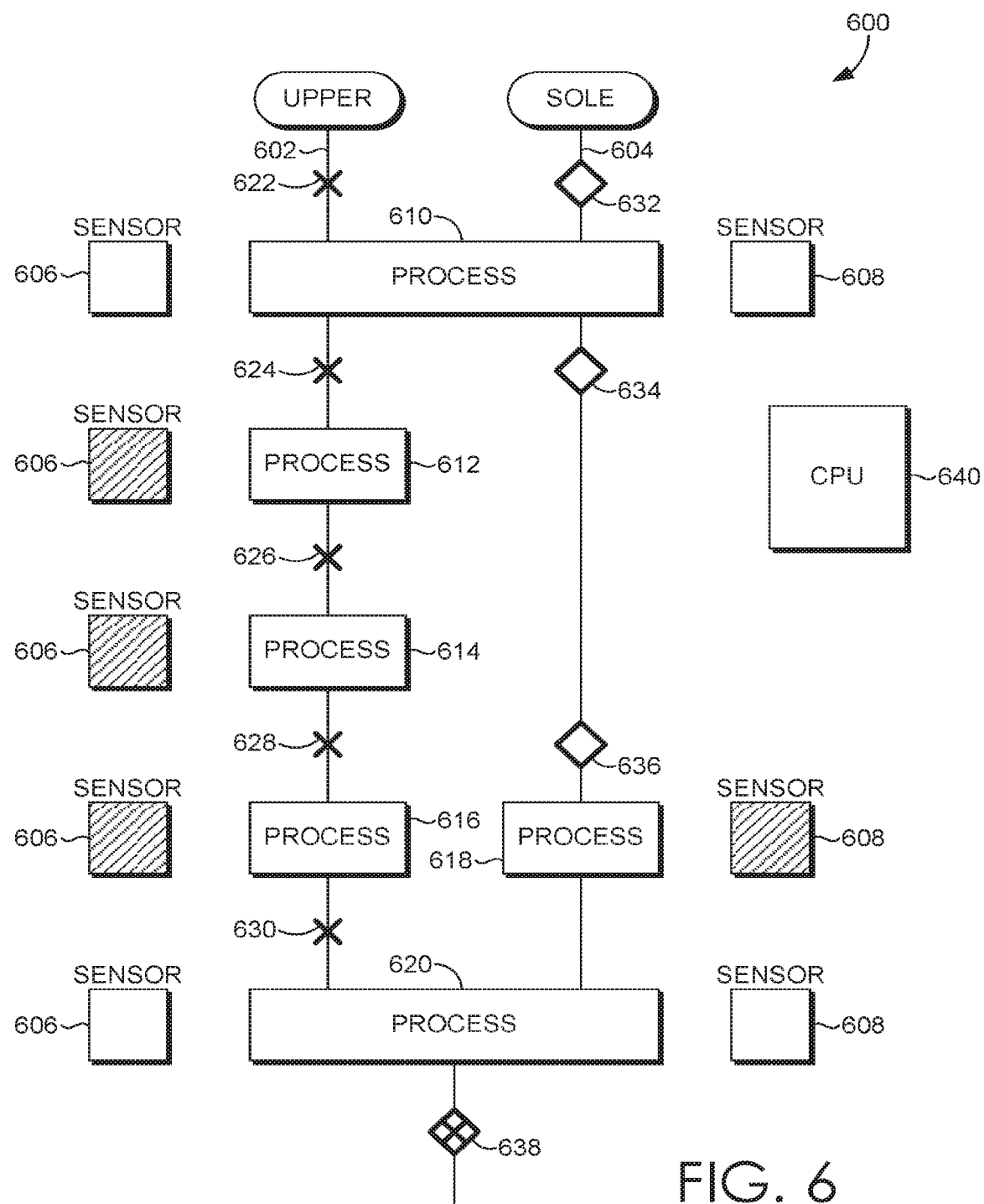
FIG. 6 depicts an exemplary system and process flow for detecting identifiers of a sole and a last during a series of processes, in accordance with aspects hereof.
Figure 7:
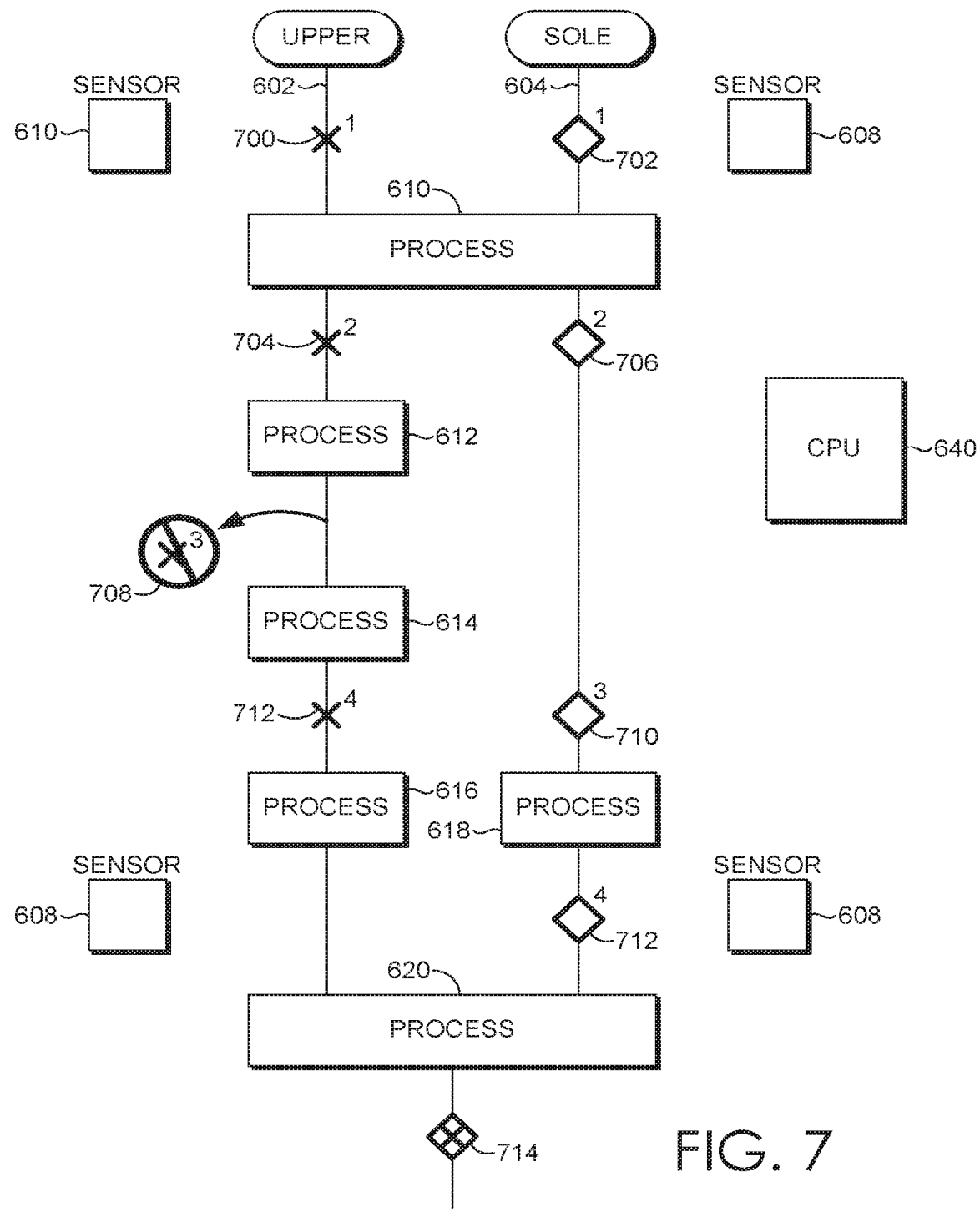
FIG. 7 depicts the exemplary system and process flow of FIG. 6 with a component falling from a known queue, in accordance with aspects hereof.

FIGS. 6 and 7 illustrate exemplary manufacturing systems 600 leveraging sensors 606 and 608 to detect identifiers associated with the upper and the sole, respectively, in accordance with aspects hereof. At a high level, the system 600 includes a plurality of processes being performed to individual components, such that the components may be tracked during their progression through the system 600 on independent manufacturing lines. The individual components may then be paired in the system 600 with confidence that a proper first component and an intended second component are mated within the system 600.

Specifically, the system 600 is comprised of a first material handling device 602 and a second material handling device 604. Additional material handling devices are contemplated. A material handling device may be a mechanism for transporting a component, such as a component used in the formation of a shoe between manufacturing processes. For example, a conveyance system like a conveyor belt, a robotic material handler, and the like are examples of material handling devices.

The system 600 is also comprised of a first sensor 606. The first sensor 606 relies on a technology useable for identifying components on the material handling device 602, such as lasts. As provided above, it is contemplated that the sensor 606 is an RFID reader capable of detecting and identifying RFID tags associated with a last have an upper lasted thereon passing along the material handling device 602, in an exemplary aspect. The number of sensor 606 that are part of the system 600 is optional, as depicted by the shaded sensor 606 associated with several processes. Therefore, any number of sensors 606 at any location of the system 600 is contemplated.

The second sensor 608 on a technology useable for identifying components on the material handling device 604, such as a sole. As provided above, the sensor 608 may be a sensor capable of detecting and identifying RFID, optical, doped substances, images, and the like. It is contemplated that any number of sensors 608 may be implemented at any location of the system 600, as illustrated with the shaded sensor 608, for example.

The system 600 is further comprised of a computing device 640 having a processor and memory. The computing device 640 may be functionally in communication with the sensor 606, sensor 608, and one or more machines/devices used at one or more processes. The computing device 640 may maintain an association between a first identifier and a second identifier, as previously discussed, to allow for and ensure a proper re-mating of two or more components, in an exemplary aspect.

The system 600 is also comprised of one or more processes, such as processes 610, 612, 614, 616, 618, and 620. The system 600 is also comprised of a number of components, such as components 622, 624, 626, 628, 630, 632, 634, 636, and 638. The components may be items onto which a manufacturing process is performed at one of the processes. For example, the components 622, 624, 626, 628, and 630 may be uppers, the components 632, 634, and 636 may be soles, and the component 638 may be a mating of multiple components, such as an upper and a sole, in an exemplary aspect.

The process 610 may be any processes. In an exemplary aspect, the process 610 is a process that involves an upper and a sole, such as biteline detection. As described, an upper and a sole are temporarily mated to detect the biteline. As part of this operation at the process 610, the sensor 606 identifies a particular upper (or a last having the upper thereon) and the sensor 608 identifies a sole. The identified upper and sole may be associated for future remating, such as at the process 620.

Each of the components may remain on a respective material handling device for further operations. For example, the process 612 may include a dryer for the upper, a printing step for the upper, a trimming step for the upper, a priming step for the upper, and the like. Similarly, the processes 614 and 616 may include any manufacturing processes as well. The process 618 may be any manufacturing process to a sole, such as drying, priming, applying adhesive, trimming, printing, and the like. At any of the processes one or more components may be damaged, moved, re-ordered, removed, or other scenarios that may limit the ability to merely count a number of components passing through the system 600 to determine an appropriate mate at a subsequent process, in an exemplary aspect. Therefore, the identifiers for each component are useable for determining and ensuring an association of intended components.

In the exemplary system 600, the process 620 includes the mating of a sole and an upper to result in the combined component 638. It is contemplated that the sensor 606 at process 620 identifies the upper being processed and the sensor 608 at the process 620 identifies the sole being processed to ensure the correct components will be mated for the previous operations performed to each (e.g., adhesive applied to a particular location based on a detected biteline of the specific combination of the sole and upper).

FIG. 7 depicts the system 600 where the identification of components will be advantageous over a mere counting of components, in accordance with aspects hereof. In FIG. 7, the material handling device 602 has components 700, 704, and 712. A component 708 is depicted as being removed from the queue of the first material handling device 602. The component 708 may have been damaged, misplaced, removed, or otherwise altered from the position in the queue of components on the first material handling device 602. The second material handling device 604 has components 702, 706, 710, and 714. For illustration purposes, components 700 and 702, 704 and 706, 708 and 710, 712 and 714 are associated with each other respectively. However, as depicted in this example, the removal of component 708 that was to be re-mated with component 710 could result in component 710 instead being mated with component 704, in this example. However, component 708 and 704 may have enough dimensional difference that the re-mating of these unintended components may result in undesired aesthetic and/or functional pairing. However, when the component 710 is to be mated at the process 620, a detection of the identifiers of component 710 and 704 will allow for a determination that those two components were not originally associated together. Therefore, once two components are mated, such as component 716, there is a confidence that the intended components were re-mated at the previous process, in this example.

Figure 8:
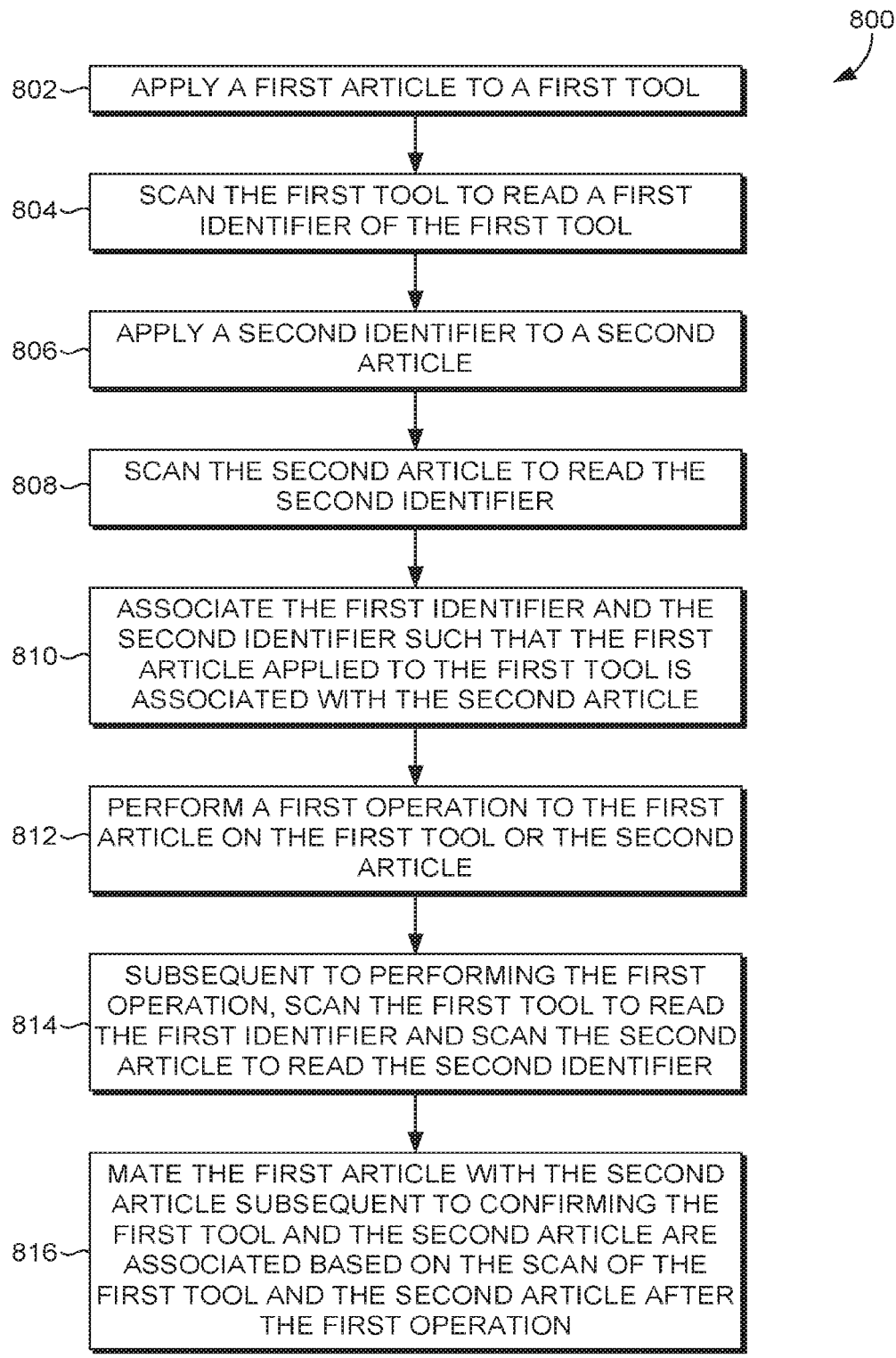
FIG. 8 depicts a method of tracking components of a manufacturing system, in accordance with aspects hereof.

FIG. 8 depicts flow diagram 800 representing a method of tracking a first article/component and a second article/component in a manufacturing system, in accordance with aspects hereof. At a block 802, a step of applying a first article to a first tool is provided. For example, the first article may be an upper and the upper may be applied to a last, which may be the first tool. At a block 804, a step of scanning the first tool to read a first identifier of the first tool is provided. In this example, the scanning of the identifier may be performed by a sensor having technology capable of identifying a signature from the identifier of the first tool. While aspect contemplated the first article being associated with an identifier of a first tool, it is also contemplated that the first article, such as an upper, has an identifier applied directly to the first article, in an exemplary aspect. Therefore, the identification of a particular tooling may be omitted in this example.

At a block 806, a step of applying a second identifier to a second article is provided. In an exemplary aspect, an identifier is applied to a sole. At a block 808, a step of scanning the second article to read the second identifier is provided. In an exemplary aspect, the scanning may be performed by a sensor adapted to detect an identity of the identifier. Therefore, when scanning to read the identifier, a signature of the identifier is determined. At a block 810, a step of associating the first identifier with the second identifier is provided. The association of the two identifiers allows for an association to be made between the first article on the first tool with the second article, in the provided aspect.

At a block 812, a step of performing a first operation to either the first article or the second article is provided. The operation may be any processes, such as applying an adhesive to a sole and/or an upper. Because the operation may be performed based on a specific combination of the first article and the second article, such as complying with a unique biteline between the first and second articles, the first operation may be unique to the combination of the first and second articles. At a block 814, a step of scanning the first tool to read the first identifier and scanning the second article to read the second identifier is performed after the first operation has completed. For example, subsequent to applying adhesive to the sole and/or the upper, the sole and the last maintaining the upper are identified to ensure an appropriate remating between the two article/components may occur.

At a block 816, a step of mating the first article with the second article subsequent to confirming the first tool and the second tool are associated based on the scanning of the first tool and the second article after the first operation, is performed. Stated differently, once a particular sole and a particular upper are confirmed to be paired articles that were used for determining one or more steps of the manufacturing process (e.g., the two components resulted in a biteline used to determine an adhesive application tool path), the sole and the upper are mated.

It is contemplated that the first tool may then be used for a third article. For example, another upper may be lasted on the first tool. Therefore, the identifier of the last may be recycled in the system for the new upper. This may reduce costs associated with aspects of the system as the identifier may be maintained in the system with the tooling as opposed to being sacrificed with the completion of an article with which the identifier is associated.

Based on the foregoing, it is contemplated that a tracking system, such as that which is provided herein, utilizes one or more sensors to identify a right shoe portion and a left shoe portion that are then associated together for eventual re-pairing following one or more manufacturing processes. For example, if each of the right shoe portion and the left shoe portion are customized relative to other shoe portions undergoing one or more manufacturing processes in a common system, it may be desired to ensure the corresponding right shoe portion and the left shoe portion are matched together following the manufacturing process so that the unique customization to each is maintained together, in an exemplary aspect. Stated differently, in a manner similar to identifying and tracking a sole and an upper to be mated following manufacturing processes, similar technology may be implemented to ensure a particular first upper and/or first sole is matched with a second upper and/or second sole following one or more manufacturing operations are performed on the various components. Therefore, an appropriate right shoe and an appropriate left shoe may be paired for packing and/or shipping utilizing aspects contemplated herein, in an exemplary aspect.

While aspects focus on the manufacturing of article of footwear, it is contemplated that the teachings hereof may be applied to a variety of goods. For example, apparel, sporting equipment, protective gear, and the like may implement aspects provided herein. Therefore, while an upper, a sole, and a last are specifically mentioned, they may be substituted for other components and tooling, in aspects.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

As used herein and in connection with the claims listed hereinafter, the terminology "any of claims" or similar variations of said terminology is intended to be interpreted such that features of claims may be combined in any combination. For example, an exemplary claim 4 may indicate the method/apparatus of any of claims 1 through 3, which is intended to be interpreted such that features of claim 1 and claim 4 may be combined, elements of claim 2 and claim 4 may be combined, elements of claims 3 and 4 may be combined, elements of claims 1, 2, and 4 may be combined, elements of claims 2, 3, and 4 may be combined, elements of claims 1, 2, 3, and 4 may be combined, and/or other variations. Further, the terminology "any of claims" or similar variations of said terminology is intended to include "any one of claims" or other variations of such terminology, as indicated by some of the examples provided above.

The invention claimed is:

1. A manufacturing tracking system, the system comprising:
   a first tool having a first identifier of a first identifier type, the first tool configured to receive a first article, wherein the first tool is a footwear last;
   a first sensor of a first sensor type, the first sensor type configured to read the first identifier, wherein the first sensor type is comprised of a radiofrequency receiving device;
   a second identifier coupled with a second article, wherein the second identifier is a second identifier type that is different from the first identifier type, wherein the second identifier is a bar code, and wherein the second article is a footwear sole component;
   a first sensor of a second sensor type, the second sensor type configured to read the second identifier;
   a first processing station for the first article;
   a second processing station for the second article;
   a second sensor of the first sensor type configured to read the first identifier following the first processing station;
   a second sensor of the second sensor type configured to read the second identifier following the second processing station; and
   a computing system having a processor and memory configured to:
      associate the first identifier and second identifier based on a temporary mating of the first article and the second article; and
      confirm the first identifier and the second identifier are associated for permanently mating the first article and the second article.

2. The system of claim 1, wherein the first identifier is a radiofrequency identification (RFID) tag.

3. The system of claim 2, wherein the RFID tag is rewritable.

4. The system of claim 1, wherein the first identifier is at least partially embedded in the first tool.

5. The system of claim 1, wherein the first identifier is positioned at the first tool in a location not obscured by a received first article on the first tool.

6. The system of claim 1, wherein the first article is a footwear upper component.

7. The system of claim 1, wherein the second sensor type reads an identifier with a different technology than the first sensor type.

8. The system of claim 1, wherein the technology type of the second identifier is configured to be integrated with both of the second article and the first article.

9. The system of claim 1, wherein the second sensor type is comprised of a radio receiver device.

10. The system of claim 1, wherein the second sensor type is comprised of an image capture device.

11. The system of claim 1, wherein the first processing station is an adhesive application station that is configured to apply an adhesive to the first article and the second processing station is an adhesive application station configured to apply an adhesive to the second article.

12. The system of claim 1, wherein a first material handling device transports the first article to the first processing station and a second material handling device transports the second article to the second processing station.

13. The system of claim 1, further comprising a third processing station, the third processing station configured to mate the first article on the first tool with the second article based, in part, on the second sensor of the first sensor type reading the first tool and the second sensor of the second sensor type reading the second article.

14. The system of claim 1, wherein the computing system is further configured to confirm the first tool and the second article are to be mated based on the second sensor of the first sensor type and the second sensor of the second sensor type.

15. A method of tracking a first article and a second article in a manufacturing system, the method comprising:
applying a first article to a first tool, wherein the first tool is a footwear last;
scanning the first tool to read a first identifier of the first tool, wherein the first identifier is a first identifier type, wherein the scanning the first tool comprises utilizing a first sensor of a first sensor type, wherein the first sensor type is comprised of a radiofrequency receiving device;
applying a second identifier to a second article, wherein the second identifier is a second identifier type that is different from the first identifier type, wherein the second identifier is a bar code, and wherein the second article is a footwear sole component;
scanning the second article to read the second identifier;
associating the first identifier and the second identifier such that the first article applied to the first tool can be associated with the second article;
prior to performing a first operation, temporarily mating the first and second articles;
performing the first operation to the first article on the first tool or the second article;
subsequent to performing the first operation, scanning the first tool to read the first identifier and scanning the second article to read the second identifier; and
mating the first article with the second article subsequent to confirming the first tool and the second article are associated based on the scan of the first tool and the second article after the first operation.

16. The method of claim 15, wherein the first article is a footwear upper.

17. The method of claim 15, further comprising:
removing the first article from the first tool subsequent to mating the first article with the second article;
applying a third article to the first tool;
scanning the first tool to read the first identifier;
applying a third identifier to a fourth article; and
associating the first identifier with the third identifier such that the third article applied to the first tool is associated with the fourth article.

* * * * *